April 3, 1956  J. E. LARSEN  2,740,424
AUTOMATIC VALVE
Filed March 17, 1955
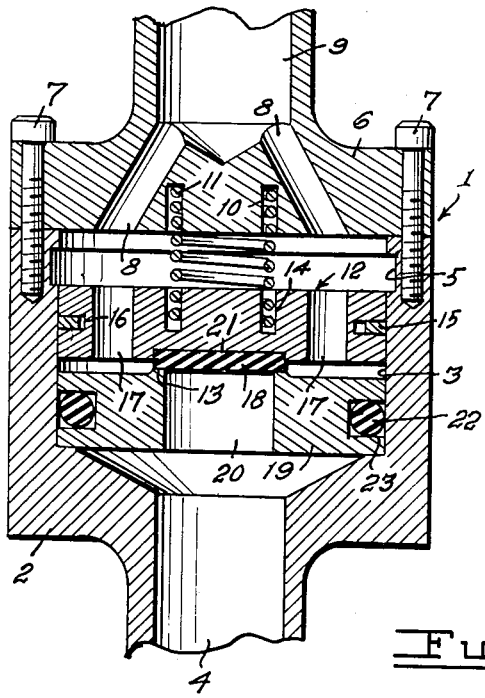
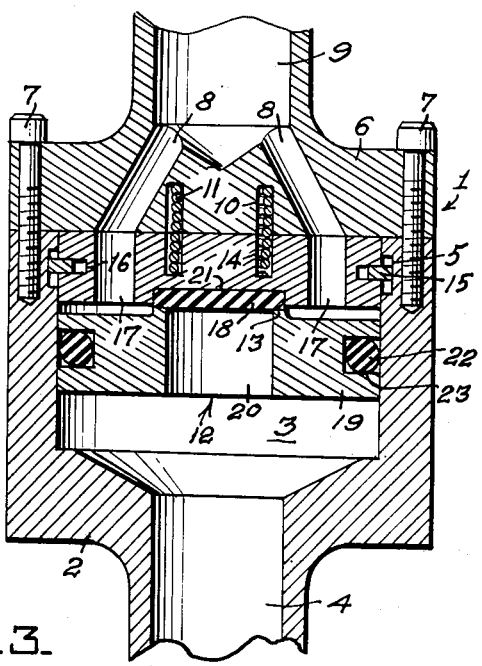
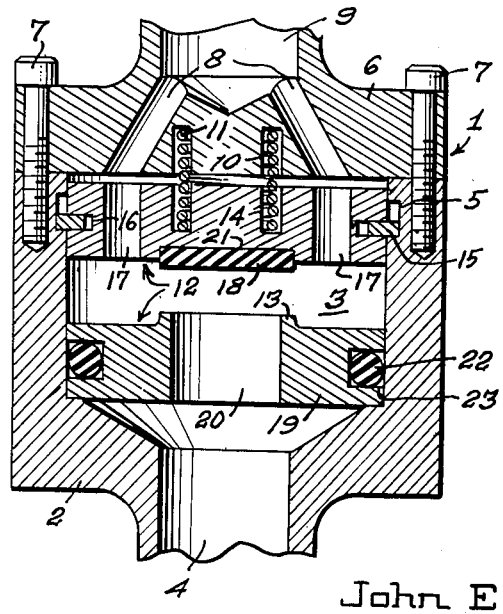
INVENTOR.
John E Larsen
BY
W. E. Thibodeau + A. W. Dew
ATTORNEYS United States Patent Office 2,740,424
Patented Apr. 3, 1956

2,740,424
AUTOMATIC VALVE

John E. Larsen, Schenectady, N. Y., assignor to the United States of America as represented by the Secretary of the Army Application March 17, 1955, Serial No. 495,073

6 Claims. (Cl. 137—508)

In rocketry, a high initial thrust is desirable at launching which should be continued until a desired maximum speed has been obtained in order to reduce the controls required for accurate flight. For this purpose the use of solid propellants is preferable to generate the pressure required for large values of acceleration. However, after acceleration ceases speed can be maintained at reduced pressure by the use of liquid-liquid or liquid-solid propellants.

This invention relates to an automatic valve by which the necessary shift-over from solid to liquid fuels, for example, can be effected. More particularly it relates to a valve which is operated automatically by and in response to an increase in back pressure or pressure on the downstream side to a value above that effective upon the upstream side, followed by a drop in downstream pressure below the upstream pressure.

It is therefore a primary object of the invention to provide a valve structure that is actuated by pressure differentials alone such as normally occur in the operation of the rocket and needing no external controls.

Another object of the invention is to provide a valve in which the operating point is automatically set, without changes to the valve, by changing the upstream pressure.

Still another object of the invention is to accomplish the rapid transfer from one propellent system to another without the use of external power, such as pressure regulators, etc.

The invention will be best understood from a consideration of the following detailed description taken in connection with the accompanying drawing, it being understood, however, that the invention is not limited by the specific illustration or description but that such illustration and description constitutes a preferred embodiment of the invention.

In the drawing:

Figure 1 is a cross sectional view of a valve construction in accordance with the invention and showing the parts in the positions they assume when the upstream pressure predominates.

Figure 2 is a similar view illustrating both members of the valve seat raised as when the downstream pressure has risen to a predetermined value above the upstream pressure.

Figure 3 is a similar view illustrating the parts after the downstream pressure has again dropped below the upstream pressure.

Referring more particularly to the drawings, 1 indicates generally a two-part, cylindrical housing for a valve mechanism, the lower part 2 is provided with a cylindrical chamber 3 communicating with a discharge or downstream port 4. The inner periphery of the chamber 3 is provided with an annular groove 5 near its upper edge for a purpose to be hereinafter described. The upper part 6 of the valve housing forms a closure to the structure and is secured to part 2 by a series of circumferentially-spaced bolts 7. A series of ports 8 are provided in part 6 to provide communcation between upstream port 9 and the chamber 3. An annular groove 10 is provided centrally in the under face of 6 between ports 8 to receive the upper end of a coil spring 11 for a purpose to be described.

A cylindrical valve member is formed of two parts 12 and 19 which are adapted to slide in the chamber 3 with a smooth fit. The part 12 is provided with an annular groove 14 cut in its upper face thereof opposite groove 10, and provides a seat for the lower end of coil spring 11 to normally bias the part 12 downwardly as the parts are viewed in the drawing. A snap ring 15 seats in an annular groove 16 in the valve part 12 and is adapted to snap into groove 5 when the part 12 moves upwardly to the position shown upon Figure 2. A series of ports 17 are drilled or otherwise formed in and through the member and mate with ports 8 when upper valve port 12 is in its upper position. The lower valve port 19 is provided with an axially bored port 20 of about the same cross sectional area as the total corresponding area of ports 8 and 17. The part 19 has a raised circular seat 13 about the upper end of port 20. A pad or gasket 18 is secured within a central recess 21 in the lower face of upper valve part 12 and when the parts are in the positions shown upon Figures 1 and 2, rests upon the circular seat to effectively close port 20. An O ring 22 is mounted within an annular groove 23 in the outer periphery of the part 19 and acts to prevent the reverse flow of gas to the upstream side of the valve.

In operation, the upstream side 9 of valve 1 is connected with a source of liquid fuels under pressure. Since the pressure on the downstream side before ignition is initiated, is below that existing in the upstream connection 9, valve member 12, assisted by the action of spring 11, is held downwardly, as shown upon Figure 1 and pad or gasket 18 is forced onto seat 13 to close the valve. After ignition begins in the rocket motor with which downstream side 4 of the valve is connected, the pressure in connection 4 rises rapidly until, when it reaches a certain value above that in connection 9, valve members 12 and 19 are forced upwardly as a unit against the thrust of spring 11. As the parts move into the upper limiting position shown upon Figure 2, ring 15 snaps into groove 5 and locks upper valve part 12 in the position shown.

As soon as the first stage of combustion has been completed and the rocket is up to speed, the pressure in connection 4 begins to drop and as soon as it has decreased to a value below that in connection 9, the lower valve part 19 is forced downwardly to its initial position as shown upon Figure 3. Pad 18 is separated from seat 13 and liquid fuel is thereafter supplied to the motor to continue combustion and maintain the attained speed.

It is apparent from the foregoing that a simple, yet effective valve mechanism has been devised for automatic shifting over from one method of propulsion to another in rocket motors.

It is to be understood that the form of the invention, herewith shown and described, is to be taken as a preferred example of the same, and that various changes in the shape, size and arrangements of parts may be resorted to without departing from the spirit of the invention, or scope of the subjoined claims.

I claim:

1. In an automatically operating valve, a housing forming a valve chamber, a valve member axially slidably fitting said chamber and comprising first and second discrete parts normally in end-to-end contiguous relation, said parts each having fluid flow apertures out of axial alignment, means carried by one said part and adapted to close the aperture in the other said part when said parts are in contiguous relation, spring means in said housing urging said parts into contiguous relation, means effective to lock said first part to said casing when moved to a predetermined position therein against the urge of said spring means, and pressure fluid connections with said housing at opposite ends of said valve member.

2. In an automatically operating valve, a housing forming a cylindrical valve chamber having an inlet at one end and an outlet at the other end, a valve member slidably fitting said chamber and comprising first and second cylindrical parts normally in end-to-end contiguous relation, each of said parts having a fluid passage out of alignment with the passage in the other part, means carried by one said part and closing the passage in the other said part, when said parts are in contiguous relation, means yieldingly urging said parts into contiguous relation, and means automatically locking one said part to said housing when moved to a predetermined position therewithin.

3. In an automatically operating valve, a housing forming a valve chamber circular in cross section, a valve member axially slidably fitting said chamber and comprising first and second discrete parts normally in end-to-end contiguous relation, said first part having at least one fluid passage therethrough radially offset from its axis and out of alignment with an axial fluid passage in the second said part, a closure member carried by said first part and adapted to close the fluid passage in said second part when said parts are in contiguous relation, spring means in said housing and urging said parts into contiguous relation, means locking said first part when said valve member is moved into a limiting position against the urge of said spring means.

4. In an automatically operating valve, a valve housing forming a cylindrical valve chamber having fluid pressure connections at its ends, a valve member in said chamber for translation axially thereof, said member comprising first and second discrete parts each slidably fitting said chamber and normally in end-to-end contiguous relation, there being an axial fluid passage through said second part and a radially offset passage through said first part, gasket means carried by one said part and closing the fluid passage through the other part when said parts are contiguous relation, spring means in said casing urging said first part toward the end of the chamber nearest said second part, and means operable automatically in response to movement of said valve member into predetermined position toward the end of the chamber nearest said first part to lock said first part in said predetermined position.

5. In an automatically operating valve, a valve housing having a valve chamber of uniform cross section transversely of its longitudinal axis, a valve member positioned within said chamber and comprising first and second parts each slidably fitting said chamber for movement axially thereof and normally in end-to-end contiguous relation with fluid passages therethrough out of alignment, gasket means carried by one said part and closing the fluid passage in the other said part when said parts are in contiguous relation only, spring means in said casing urging said first part toward said second part and both parts toward one end of said chamber, and means locking said first part at the other end of said chamber when moved thereto against the action of said spring means.

6. In an automatically opening valve, a casing forming a cylindrical valve chamber having an inlet connection at its first end and an outlet connection at its second end, first and second cylindrical valve parts each slidably fitting said chamber for axial movement, said first part having a radially offset fluid passage and said second part having an axial fluid passage out of alignment with the fluid passage in said first part, means carried by one said part and sealing the fluid passage in the other said part when said parts are in end-to-end contiguous relation, a coil spring in said housing interposed between said first part and the adjacent end of said chamber and urging said parts toward contiguous relation at the other end of said chamber and a snap ring fitting a circumferential groove in said first part, said ring snapping into a groove in the wall of said chamber when said first part is moved to the adjacent end of said chamber against the action of said spring.

References Cited in the file of this patent

FOREIGN PATENTS 946,759    France ---------------- June 14, 1949